Aug. 23, 1960    M. L. STEINBUCH ET AL    2,950,081
ROTARY PLUG VALVE HAVING REPLACEABLE SEATS
Filed May 16, 1955

INVENTORS.
Marvin L. Steinbuch.
BY Harold W. Wyatt.
Wood, Herron & Evans.
ATTORNEYS.

United States Patent Office 2,950,081
Patented Aug. 23, 1960

2,950,081

ROTARY PLUG VALVE HAVING REPLACEABLE SEATS

Marvin L. Steinbuch and Harold W. Wyatt, Cincinnati, Ohio, assignors to The Lunkenheimer Company, Cincinnati, Ohio, a corporation of Ohio Filed May 16, 1955, Ser. No. 508,643

6 Claims. (Cl. 251—317)

The present invention relates to valves and is particularly directed to a seat construction for valves of the type known as stopcocks.

The principal object of the present invention is to provide a stopcock of simple construction which is adapted to give extremely long periods of leakproof service. A valve of the present invention embodies deformable plastic seats which are compressed between two opposed surfaces of the valves to seal off one or more fluid ports within the valve. Because of their deformable nature, the seats conform to the contours of the opposed surfaces and are thus effective to prevent leakage even though one or both of the surfaces should become scratched, eroded, or damaged in some other way. In addition, the present stopcock is provided with a tapered plug and means for axially shifting the plug to compensate for any appreciable wear in the seats or valve walls. Moreover, the seats of the present cock are removable and can be replaced when they become badly worn so that the present valve can be maintained in a completely leakproof condition for indefinite periods.

A preferred form of cock constructed in accordance with the present invention, includes a body molded from a synthetic plastic material and configurated to form two opposed fluid ports communicating with a central chamber. A tapered plug is rotatably mounted within the central chamber and includes a passageway adapted to interconnect the fluid ports when the plug is in an open position, and seating elements for sealing off the ports when the plug is turned to a closed position.

The seating elements of the present invention are preferably formed by molding one of the fluorinated hydrocarbons, such as Teflon or Kel-F. In a preferred embodiment, each of the seating elements includes a hollow stem and a thin flange extending radially from the open end of the stem. The stem is adapted to reside in an opening formed in the valve plug and is held in place by frictional engagement with the walls of the opening. The annular flange is readily deformable and conforms to the shape of the tapered wall of the plug. When the plug is in a closed position, the annular flange is compressed between the plug and a portion of the chamber wall surrounding one of the fluid ports. The sealing pressure exerted upon the seat can be varied by shifting the plug axially of the chamber. A nut threadedly engaging the valve body and in abutment with one end of the plug is provided for effecting this adjustment.

One of the principal advantages of the present cock construction is that it substantially eliminates fluid leakage. The deformable plastic seat which is compressed between the plug and chamber provides a tight seal even though the wall might be scratched or eroded. Moreover, should the seating member or chamber walls become appreciably worn, so that leakage begins, it is only necessary to tighten the plug-engaging nut, causing the tapered plug to be shifted downwardly and returning the sealing pressure to a point where the valve is again made leakproof.

Another advantage of the present invention is that a seat which has become badly worn can quickly and simply be replaced. This is done by removing the nut and withdrawing the plug from the valve. The insertable seat is then pried from the plug, either by hand, or by means of a screwdriver or knife blade; and a new seat is pressed into the plug opening. After the plug is replaced and the requisite seating pressure applied by tightening the nut, the valve is ready to be returned to service. This entire operation requires less than one minute and is accomplished without ever removing the valve from the line.

An additional advantage of the present invention is that valve seats formed from fluorinated hydrocarbons are extremely slippery so that the valve is easily opened and closed even though appreciable pressure is placed upon the seats. Consequently, the present valve construction completely eliminates any need for internal lubrication either to obtain an effective seal or to facilitate rotation of the plug.

A still further advantage of the present invention is that the entire cock is of an extremely simple construction and can be economically manufactured and serviced. The preferred form of cock described in detail below comprises only five readily fabricated parts. These parts can largely be formed by molding. The valve seats, rotatable plug and chamber walls require no machining since the seats are sufficiently deformable to compensate for any irregularities of the plug or chamber caused by molding.

Another advantage of the present invention is that the cock can be employed without any modification for sealing either a high pressure line or a low pressure line. The entire sealing action is due to the compressive force applied to the plastic seats by adjusting the tapered plug. The seal is not dependent, as is the case in some valves of the prior art employing gasket-type materials, upon the pressure of the fluid admitted to the cock.

A further advantage of the present valve construction is that it provides means for obtaining an effective seat in a cock fabricated entirely of plastic material which inherently cannot be stressed as highly as metals conventionally employed in valve constructions; but which nevertheless are extremely advantageous for use in handling corrosive fluids or fluids which would be contaminated by a metal valve.

These and other advantages of the present invention will be more readily apparent from a further consideration of the following detailed description of the drawings illustrating a preferred embodiment of the invention.

Figure 1:
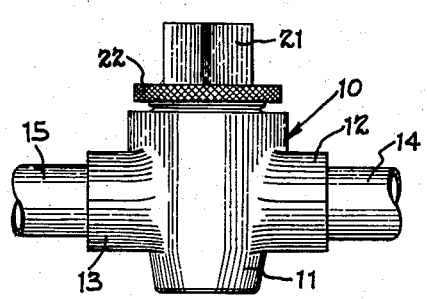
Figure 1 is a side elevational view of the valve.
Figure 2:
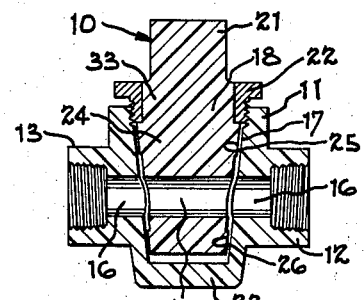
Figure 2 is a longitudinal cross sectional view of the valve with the plug in an open position.

As shown in Figures 1 and 2, a cock 10 constructed in accordance with the present invention generally comprises a body 11 having two aligned necks 12 and 13 adapted to receive pipe sections 14 and 15 when the valve is installed in a line. The valve body is provided with fluid ports 16 extending through each of the necks, and a central chamber 17 in communication with the ports and adapted to receive a rotatable plug 18. Plug 18 includes a transverse passageway 19 adapted to interconnect the inlet and outlet ports 16 when the plug is turned to an open position. The plug also carries two seating elements 20 adapted to seal the fluid ports when the plug is adjusted to a closed position. The upper end of plug 18 is provided with an operating stem 21 for selectively rotating the plug to either its open or closed position. A nut 22 fits over the upper end of the plug and threadably engages the valve body. This nut prevents axial displacement of the plug and provides means for adjusting the pressure on the seating elements as explained below.

More particularly, housing 11, is preferably formed from a synthetic resin molding. Any of a large number of plastics can be employed such as polyvinyl chloride, the copolymer of polyvinyl chloride and polyvinyl acetate, other polyvinyl halides such as polyvinyl fluoride, the phenolic resins, methylmethacrylate resins alone or copolymerized with vinyl halides, nitra-cellulose, cellulose acetate, polyamids, the urea resins, or polyethylene reinforced with glass fibers or the like. Alternatively, if the valve is to be used in installations where corrosion resistance is not an acute problem a metal body can be used.

In any event, threads are molded or cut in each of the necks 12 and 13 for connecting the valve to sections of pipe. A fluid port 16 is formed in each of the necks and connects with central chamber 17. This chamber is tapered and is closed at one end by bottom wall 23 of the valve body; but is open at the other end to permit insertion of plug 18. Plug 18 is also preferably formed from a plastic molding utilizing materials of the type described above. However, it is contemplated that in some instances plug 18 can also be formed from a suitable metal. The plug includes a tapered cylindrical portion 24 configurated to form an upper shoulder 25 and a lower shoulder 26, these shoulders being slightly smaller than the upper and lower ends of chamber 17. The plug is also configurated to form a transverse passageway 19 adapted to communicate with fluid ports 16. Two openings 27 are formed in the tapered portion of the plug at right angles to passageway 19. These openings are disposed so that they face fluid ports 16 when the plug is in the closed position and are adapted to receive insertable seating elements 20.

Figure 4:
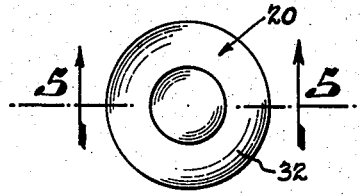
Figure 4 is a top elevational view of an insertable seat.
Figure 5:
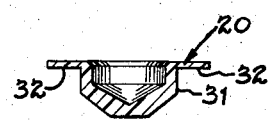
Figure 5 is a cross sectional view of the seat taken along line 5—5 of Figure 4.
Figure 6:
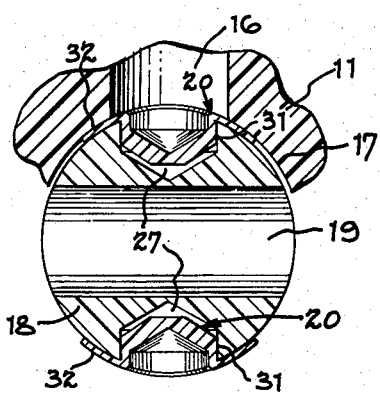
Figure 6 is transverse cross sectional view of the plug.

As best shown in Figures 4, 5, and 6, each of the renewable seats includes a generally cylindrical stem portion 31 of substantially the same configuration as opening 27 and a relatively thin outwardly extending flange 32 adapted to overlie the adjacent area of the plug. The insertable seating elements are preferably injection molded from a fluorinated hydrocarbon such as "Teflon," a polytetrafluorethylene; or "Kel-F," or fluorethylene which are polymonochlorotrifluorethylenes. Materials of this group are particularly advantageous because of their great chemical inertness and even more importantly because they are extremely slippery, so that the plug is relatively easy to turn, even without any internal lubrication.

In the preferred embodiment, stem 31 is in the form of a hollow cylinder, the outer diameter of which is substantially the same as the diameter of opening 27 so that when the stem is pressed into the opening it is frictionally held in place. Flange 32 extends outwardly from the open end of the stem in a direction perpendicular to the stem axis. This flange is preferably thin enough that it can readily be bent to conform to the contour of the plug as shown in Figure 6. I have determined that a flange of the order of 1/32 of an inch thick is very suitable. It is contemplated, however, that depending upon the size of the plug its taper, and other factors which may vary, the flange can be made thinner or thicker as desired.

Figure 3:
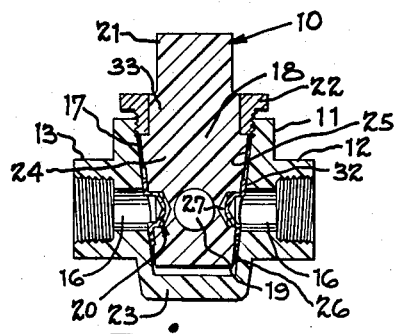
Figure 3 is a longitudinal cross sectional view of the valve with the plug in a closed position.

As best shown in Figures 1–3, plug 18 is supported at its upper end by the engagement of cylindrical portion 33 of stem 21 with the central aperture of nut 22. The tapered portion of the plug is supported by the engagement of seats 20 with the side wall of chamber 17. The lower end of the plug is spaced from bottom wall 23 of the chamber, while the tapered wall of the plug is spaced from the side wall of the chamber; so that when the plug is shifted axially the compressive force exerted on seats 20 is varied.

In operation, the cock is opened to permit fluid flow by rotating plug 18 until transverse bore 19 is brought into alignment with ports 16. In order to close the valve, the plug is turned by means of stem 21 until passageway 19 is positioned at right angles to ports 16 and seating elements 20 are disposed in registry with the ends of bores 16. The annular flange of each seating element is pressed firmly against the area of the wall surrounding one of ports 16 so that both of the ports are closed to fluid flow.

If after a period of use, a seating element, or the tapered wall of chamber 17 becomes appreciably worn so that leakage occurs, the valve can be rendered leakproof by increasing the sealing pressure between the seats and chamber wall. This adjustment is made by threading nut 22 inwardly so that the bottom surface of the nut bearing against shoulder 25 forces the tapered plug further into chamber 17. The seating pressure can thus be selectively controlled by manipulating nut 22 and is substantially independent of the fluid pressure in ports 16. Consequently the present valve is equally effective to seal either high pressure or low pressure fluids.

If after a substantial period of use, it should be desired to replace one or both of the seats, this can be quickly and easily accomplished by loosening nut 22 and removing the plug from the valve. The worn seat can then be pried outwardly from the opening in the plug and a new seat pressed into place. Plug 18 can then be reinserted into chamber 17 and nut 22 tightened to provide the desired seating pressure. In this matter worn valve seats can be replaced in less than a minute without removing the valve from the line.

Having described our invention, we claim:

1. A valve, comprising a body configurated to form a plurality of fluid ports and a chamber disposed intermediate said ports, a plug rotatably mounted within said chamber and configurated to form a transverse fluid passageway and a recess spaced from the ends of said passageway, said plug being smaller than said chamber whereby the surface of said plug is spaced from said valve body, a removable seat carried by said plug, said seat being formed of a fluorinated hydrocarbon and including a portion disposed within the recess provided in said plug, said portion being of substantially the same size as said recess, whereby said portion is frictionally held within said recess, and a portion extending outwardly beyond the surface of said plug for engagement with the wall of said chamber surrounding one of said ports, said last named portion being compressed between the wall of said chamber and the surface of said plug surrounding said recess, and actuator means for selectively placing said transverse fluid passageway in and out of communication with said fluid ports.

2. A valve, comprising a body configurated to form a plurality of fluid ports and a chamber communicating with said ports, said chamber having tapered side walls, a tapered plug rotatably mounted within said chamber, said plug being configurated to form a transverse fluid passageway and an opening displaced from the ends of said passageway, said plug being smaller than said chamber whereby the surface of said plug is spaced from said valve body, a deformable plastic seat carried by said plug and adapted for facial engagement with a wall of said chamber surrounding one of said fluid ports, said seating element comprising a stem disposed within said opening in the plug and a thin annular flange of diameter greater than said port, said flange extending substantially perpendicular to the axis of said stem and being disposed intermediate said plug and said valve body, and means for axially shifting said plug within said body to adjust the pressure on said seat, and actuator means for selectively placing said transverse fluid passageway in and out of communication with said fluid ports.

3. A valve, comprising a body configurated to form a plurality of fluid ports and a chamber communicating with said ports, said chamber having tapered side walls, a tapered plug rotatably mounted within said chamber, said plug being configurated to form a transverse fluid passageway and an opening displaced from the ends of said passageways, said plug being smaller than said chamber, whereby the surface of said plug is spaced from said valve body, a deformable plastic seating element carried by said plug and adapted for facial engagement with a wall of said chamber surrounding one of said fluid ports, said seating element comprising a hollow stem adapted to reside within the opening formed in said plug in frictional engagement with the walls thereof, an annular flange joined to the open end of said stem and extending substantially perpendicular to the axis of said stem, said flange being disposed intermediate said plug and said valve body and residing in engagement with the tapered wall of said plug, and being of greater diameter than said port, and means for axially shifting said plug within said body to adjust the pressure on said seating element, and actuator means for selectively placing said transverse fluid passageway in and out of communication with said fluid ports.

4. A valve, comprising a body configured to form a plurality of fluid ports and a chamber communicating with said ports, a plug rotatably mounted within said chamber, said plug being configured to form a transverse fluid passageway and an opening displaced from the ends of said passageway, said plug being smaller than said chamber, whereby the surface of said plug is spaced from said valve body, a deformable plastic seating element carried by said plug and adapted for facial engagement with a wall of said chamber surrounding one of said fluid ports, said seating element comprising a stem disposed within the opening in said plug in frictional engagement with the walls thereof, and a thin, annular flange of diameter greater than said port, said flange extending substantially perpendicular to the axis of said stem and being disposed between said plug and said valve body, and actuator means for selectively placing said transverse fluid passageway in and out of communication with said fluid ports.

5. A valve, comprising a body configured to form a pair of opposed fluid ports and a chamber disposed intermediate said ports, a plug having a transverse fluid passageway and rotatably mounted within said chamber and having a pair of recesses disposed from the ends of said passageway formed therein, said plug being smaller than said chamber, whereby the surface of said plug is spaced from said valve body, and a pair of removable seats carried by said plug, each of said seats including a thin flange of a fluorinated hydrocarbon and a portion disposed within one of the recesses in said plug, the flange of each of said seats being disposed intermediate said plug and said valve body and being adapted to engage the wall of said chamber surrounding one of said ports, and actuator means for selectively placing said transverse fluid passageway in and out of communication with said fluid ports.

6. A valve, comprising a body configurated to form a plurality of fluid ports and a chamber communicating with said ports, said chamber having tapered side walls, a tapered plug mounted within said chamber for rotatable movement relative thereto, said tapered plug also being mounted for movement along the axis of rotation of said plug, and means for limiting the axial movement of said plug, said plug being smaller than said chamber, whereby the surface of said plug is spaced from said valve body, said plug being configurated to form a transverse fluid passageway and an opening displaced from the ends of said passageway, a deformable plastic seat carried by said plug and adapted for facial engagement with a wall of said chamber surrounding one of said fluid ports, said seating element comprising a stem disposed within said opening in the plug and a thin annular flange of diameter greater than said port, said flange extending substantially perpendicular to the axis of said stem, and being disposed intermediate said plug and said valve body, the width of said flange being greater than the limited axial movement of said plug within the chamber, and means for axially shifting said plug within said body to adjust the pressure on said seat, and actuator means for selectively placing said transverse fluid passageway in and out of communication with said fluid ports.

References Cited in the file of this patent

UNITED STATES PATENTS

| 477,605 | Pratt | June 21, 1892 |
| 477,606 | Pratt | June 21, 1892 |
| 2,505,270 | Allen | Apr. 25, 1950 |
| 2,514,551 | Monroe | July 11, 1950 |
| 2,580,762 | Grenier | Jan. 1, 1952 |
| 2,670,574 | Shuster | Mar. 2, 1954 |
| 2,713,987 | Schenck | July 26, 1955 |

FOREIGN PATENTS

| 755,536 | Great Britain | Aug. 22, 1956 |

OTHER REFERENCES

Chemical and Engineering News, vol. 30, No. 26, June 30, 1952, pp. 2688–2691 (TP–1–I 418).